United States Patent [19]

Lange et al.

[11] Patent Number: 4,703,087
[45] Date of Patent: Oct. 27, 1987

[54] WATER-SOLUBLE POLYMERS AND THEIR USE AS AUXILIARIES FOR BUILDING MATERIALS

[75] Inventors: Werner Lange, Visselhövede; Frank Höhl, Neuenkirchen; Klaus Szablikowski, Walsrode, all of Fed. Rep. of Germany

[73] Assignee: Wolff Walsrode AG, Walsrode, Fed. Rep. of Germany

[21] Appl. No.: 942,142

[22] Filed: Dec. 16, 1986

[30] Foreign Application Priority Data

Dec. 21, 1985 [DE] Fed. Rep. of Germany ....... 3545596

[51] Int. Cl.$^4$ .............................................. C08F 82/80
[52] U.S. Cl. .................................. 525/161; 525/163; 525/326.9; 525/328.4
[58] Field of Search ............... 526/307.5, 307.7, 307.8, 526/258, 264, 307.1, 320; 525/161, 163, 326.9, 328.4

[56] References Cited

U.S. PATENT DOCUMENTS

| 2,892,783 | 6/1959 | Stuart et al. | 526/307.5 |
| 2,927,911 | 3/1960 | Lang | 526/307.5 |
| 3,914,463 | 10/1975 | Mercurio et al. | 525/32 |
| 4,098,985 | 7/1978 | Brabetz et al. | 528/503 |
| 4,322,516 | 3/1982 | Wiest et al. | 526/307.7 |
| 4,379,864 | 4/1983 | Gallop et al. | 526/307.5 |
| 4,427,836 | 1/1984 | Kowalski et al. | 525/301 |

FOREIGN PATENT DOCUMENTS

| 1182828 | 12/1964 | Fed. Rep. of Germany ... 526/307.5 |
| 0044508 | 1/1982 | European Pat. Off. . |
| 1325607 | 8/1973 | United Kingdom . |

Primary Examiner—Joseph L. Schofer
Assistant Examiner—N. Sarofim
Attorney, Agent, or Firm—Sprung Horn Kramer & Woods

[57] ABSTRACT

New water-soluble copolymers based on acrylic acid derivatives and their use as auxiliaries for building materials.

3 Claims, No Drawings

WATER-SOLUBLE POLYMERS AND THEIR USE AS AUXILIARIES FOR BUILDING MATERIALS

The present invention relates to new water-soluble copolymers based on acrylic acid derivatives and their use as auxiliaries for building materials.

Wear floorings, e.g. wooden parquetry, tiling or plastic floor coverings, can only be laid on horizontal and absolutely flat floor surfaces. When buildings are constructed, however, only uneven concrete surfaces are obtained in the carcass, so that, for this reason, a screed must usually next be applied to these uneven concrete coverings.

Whereas mastic asphalt, cement or magnesite screeds, the laying, levelling and smoothing of which involved a considerable amount of work, were used in the past for production of the necessary horizontal and flat surfaces, mortar mixtures have also been known for some time which have a flowable and pumpable consistency after addition of water and which, under the influence of gravity, level and smooth themselves like a liquid on the uneven floor.

Thus, a mortar compound is known from DE-OS (German Published Specification) No. 1,943,634 which comprises anhydrite, sand if appropriate, an activator, a resin modified with sulphite or sulphonic acid and based on an amino-s-triazine with at least 2 $NH_2$ groups as a strength-increasing additive, a wetting agent and, if appropriate, an antifoam agent. These are melamine formaldehyde condensation products which are added as concrete plasticizers. The aim of the plasticizing of the concrete is to produce the most easily pumpable concrete mixture possible, which flows extremely well and hardens as fast as possible.

A disadvantage of these products based on melamine formaldehyde is that their plasticizing action only lasts $\approx 15$ minutes.

In addition, the demands on a flow-control auxiliary in a self-levelling flow screed are fundamentally different from those on a concrete plasticizer. Thus, completely homogeneous flow of the screed mass is necessary with a flow-control auxiliary for a self-levelling flow screed. In particular, no sedimentation of the heavier components must occur during flow. The flow-control auxiliary for concrete screed must thus have a certain carrying capacity for the mixture of building materials. Since delays are entirely possible on the building site during application of the flow screed, it is necessary that the flow screed auxiliary retains its full effectiveness even 1 hour after addition to the mixture of building materials.

In auxiliaries based on melamine formaldehyde condensation products, however, sedimentation of the heavier components occurs during flow. In addition, it is not possible to return the flow screed mixture to a perfectly flowable condition by stirring after 1 hour, so that homogeneous flow is achieved. Attempts have also been made to improve the carrying capacity by means of additives. This has, however, been only partially successful.

Surprisingly, it is now possible to prepare, with the polymers according to the invention, flow-control auxiliaries for mixtures of building materials which cause the desired homogeneous flow of mixtures of building materials into screeds with absolutely flat surfaces even when added in small amoaunts. It is not necessary here to add any auxiliaries and additivies to achieve homogeneous flow. It is particularly advantageous in these polymers according to the invention that their full effectiveness is retained even 1 hours after addition to the mixture of building materials.

The invention thus relates to water-soluble copolymers comprising (1) 5 to 50 mol %, preferably 10 to 40 mol %, of radicals of the formula I

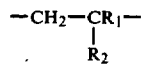

(2) 0 to 20 mol %, preferably 0 to 15 mol %, of radicals of the formula II

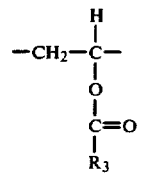

(3) 5 to 50 mol %, preferably 20 to 50 mol %, of radicals of the formula III

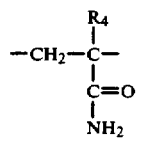

(4) 5 to 50 mol %, preferably 10 to 40 mol %, of radicals of the formula IVa or IVb

and (5) 2 to 50 mol %, preferably 5 to 30 mol %, of radicals of the formula V

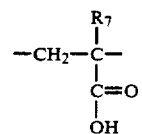

where the sum of (1) to (5) must always amount to 100 mol % and the use thereof as auxiliaries for building materials, in particular as flow-control aids, in self-levelling screed mixtures and floor levelling compounds.

In the radicals I to VI of the random polymers:

$R_1$ denotes hydrogen or a methyl group, $R_2$ denotes an alkoxycarbonyl group with 1 to 4 C atoms in the alkoxy group, preferably an isobutyloxycarbonyl or tert.-butyloxycarbonyl group, an alkanoyloxy group with 1 to 4 C atoms or a $\beta$-hydroxyalkoxycarbonyl with 2 or 3 C atoms, $R_3$ denotes a methyl or an ethyl group, $R_4$ denotes hydrogen or a methyl group, $R_5$ and $R_6$, the same or different, denote hydrogen or a methyl or ethyl group, or together form a trimethylene or pentamethylene ring, $R_7$ denotes hydrogen or a methyl group, and X denotes an imidazole or carbazole radical.

Preferably, the polymers according to the invention are, subsequent to the polymerization, further reacted with low, aliphatic aldehydes, preferably formaldehyde, and a sulphite, preferably sodium hydrogen sulphite, 0.1 to 1 mol, preferably 0.4 to 0.8 mol of aldehyde being added per mol of the radicals of the formula III. The sulphite is preferably used in equimolar amounts relative to the aldehyde.

Reaction products of copolymers with formaldehyde and sodium hydrogen sulphite which are derived from ethyl acrylate, vinyl acetate, acrylamide, 1-vinyl-2-pyrrolidone and acrylic acid are particularly preferred.

This excellent effectiveness of the copolymers according to the invention as flow-control auxiliaries in mixtures of building materials was completely surprising, since similarly constructed copolymers of e.g. acrylamide, AMPS ® and vinylpyrrolidone are completely unsuitable.

The polymers according to the invention can be prepared in a manner known per se, e.g. by radical polymerization in aqueous solution.

The polymerization here is, as usual, carried out in an inert gas atmosphere, preferably under nitrogen. The polymerization temperature should be between 20° and 100° C., preferably between 30° and 60° C.

The polymerization can be initiated by the usual polymerization initiators, e.g. $K_2S_2O_8$, $H_2O_2$, $(NH_4)_2-S_2O_8$, $H_2O_2$/isoascorbic acid mixture. In general, 1 to 10 g of polymerization initiator is used per 100 g of monomers.

To carry out the polymerization, the monomers are preferably dissolved in water at a concentration in the range of 20 to 40% by weight of total monomers. A surfactant can be added to improve the distribution of the non-water-soluble monomers. As the aim is to obtain polymers with the shortest chains possible, relatively large amounts of a chain-length regulator are used. Hydroquinone, isopropanol or further suitable chain-length regulators can be used for this. The reaction is started after flushing with nitrogen. Preferably, the copolymers are reacted with aliphatic aldehydes, such as formadehyde, and a sulphite, preferably sodium hydrogen sulphite after the polymerization, in order to introduce sulphonic acid groups into the final product.

Here, the aldehyde is used in amounts of 0.1 to 1.0 mol per mol of radicals of the formula (III), i.e. per acrylamide. The soldium hydrogen sulphite is used advantageously in equimolar amounts relative to the aldehyde.

The reaction temperature should be between 20° and 100° C., advantageously between 40° and 80° C.

The copolymer according to the invention can be isolated from the aqueous solution by distilling off the water or precipitation by mixing the solution with a water-miscible organic solvent, such as methanol, ethanol, acetone or the like. However, the aqueous solution of the reaction product is preferably used directly as a flow-control auxiliary for screed mixtures, possibly after adjusting to a desired concentration.

The copolymers according to the invention are eminently suitable as auxiliaries for mixtures of building materials. They cause homogeneous, even flow of screed mixtures to a completely flat, smooth surface. It is particularly advantageous that these copolymers according to the invention still fully retain their effectiveness as long as 1 hour after addition of the polymer to the mixture of building materials. An excellent flow-control auxiliary is thus available for use in screed mixtures and floor levelling compounds.

The invention thus further relates to mixtures of building materials, particularly screed mixtures, based on cement, sand and fly ash, which are characterized in that they contain the copolymers according to the invention as flow-control auxiliaries.

Conventionally, for the formulation of flow screed mixtures a flow-control auxiliary, such as for example based on a melamine formaldehyde condensation product, is used in amounts of from 0.4 to 0.8% by weight, based on the solid used. With the copolymers according to the invention, however, it is possible to achieve excellent flow control of screed mixtures even by using an amount of only 50% of the hitherto usual amounts. The flow-control auxiliary according to the invention thus demonstrates its full effectiveness even in amounts of 0.05 to 1% by weight, preferably 0.15 to 0.4% by weight, referred to solids. The screed mixtures are preferably based on cement, sand and fly ash.

EXAMPLE 1

A 1 liter polymerization flask, fitted with stirrer, reflux condenser and gas inlet tube for inert gas, is charged with 304.45 g of deionized water. 23.05 g of methyl acrylate are then added. This amount corresponds to 0.2677 mol of methyl acrylate.

194.53 g of 30% strength aqueous acrylamide solution =0.8210 mol, and 10.76 g of vinyl acetate=0.1249 mol, and 47.55 g of 1-vinyl-2-pyrrolidone=0.4284 mol, and 10.29 g of acrylic acid=0.1428 mol are then added.

These amounts of monomer used correspond to a composition of 15 mol % of methyl acrylate, 7 mol % of vinyl acetate, 46 mol % of acrylamide, 24 mol % of 1-vinyl-2-pyrrolidone and 8 mol % of acrylic acid.

As a chain-length regulator, hydroquinone is used, in an amount of 6 g of 1% strength solution=0.04%, referred to the total amount of monomer taken. In order to achieve better distribution of the non-water-soluble monomers, a solution of the wetting agent Genapol ®, in an amount of 3.38 g of 1% strength solution=0.1% referred to the sum of the amounts of vinyl acetate and methyl acrylate taken, is added.

After the additions are complete, the mixture is stirred at a speed of 350 to 400 rpm and flushed with about 10 liters per hour of nitrogen in order to displace the oxygen from the solution. This nitrogen flushing is maintained throughout the entire reaction time. The residual oxygen content at the start of the polymerization is advantageously between 1.2 and 1.8 ppm. The pH value of the reaction mixture is about 2.8. The reaction mixture is warmed to 35° C.

After flushing with nitrogen at about 10 liters per hour for 20 minutes, the polymerization reaction is initiated by addition of 0.75 g of $K_2S_2O_8$=0.5% (all initiator quantities are referred to the amounts of monomer taken). After 1 hour, a further 0.75 g of $K_2S_2O_8$=0.5%, referred to the amount of monomer taken, is added. After 2 hours, 1.5 g of $K_2S_2O_8$=1% are added. The reaction mixture becomes slightly viscous 4 hours after the start of the reaction, and a further 1.5 g of $K_2S_2O_8 = 1\%$ are added. The reaction is completed after 6 hours.

The intermediate product obtained is characterized by the following data:

| pH value: | 2.1 |
|---|---|
| Concentration: | 24.81% by weight |
| Relative viscosity ($VT_{24}$ Haake): | 100 mPa.s |

Following the polymerization, the polymer is reacted with formaldehyde and sodium hydrogen sulphite.

For this purpose, the polymer solution is adjusted to a pH value of 9.2 at 35° C. with 14.48 g of 50% caustic soda solution and 0.47 g of 38% sulphuric acid.

30.82 g of 40% strength formaldehyde solution are then added and the mixture is heated to 50° C. with constant stirring. The temperature of 50° C. is maintained for 2 hours. This quantity of formaldehyde corresponds to 0.5 molar portions of the acrylamide used.

42.72 g of $NaHSO_3$ is now added and the mixture is heated to a temperature of 60° C. The $NaHSO_3$ quantity is equimolar to the amount of formaldehyde.

The solution obtained can be used directly. The polymers 2 to 31, the composition of which can be seen from Table 1, can be prepared analogously to Example 1.

In Table 1, the following abbreviations are used:
AMPS ®: sodium salt of 2-acrylamido-2-methylpropanesulphonic acid
NVPY: 1-vinyl-2-pyrrolidone
AAM: acrylamide
EA: ethyl acrylate
IBA: isobutyl acrylate
TBA: tertiary-butyl acrylate
HEA: hydroxyethyl acrylate
HPA: hydroxypropyl acrylate
VAC: vinyl acetate
VMACAM: N-vinyl-N-methylacetamide
SVSA: sodium vinyl sulphonate
SSS: sodium stryrene sulphonate
AA: acrylic acid
MAA: methacrylic acid
MA: methacrylate
HPMA: hydroxypropyl methacrylate
HEMA: hydroxyethyl methacrylate
VCLT: vinyl caprolactam.

TABLE 1

| Example No. | mol % 1 | Mon. 1 | mol % 2 | Mon. 2 | mol % 3 | Mon. 3 | mol % 4 | Mon. 4 | mol % 5 | Mon. 5 | Viscosity | Molar proportions of formaldehyde referred to proportion of acrylamide |
|---|---|---|---|---|---|---|---|---|---|---|---|---|
| 1 | 15 | MA | 7 | VAC | 46 | AAM | 24 | NVPY | 8 | AA | 100 | 0.5 |
| 2 | 15 | HEA | 7 | VAC | 46 | AAM | 24 | NVPY | 8 | AA | 400 | 0.5 |
| 3 | 15 | EA | 7 | VAC | 46 | AAM | 24 | VMACAM | 8 | AA | 1200 | 0.5 |
| 4 | 15 | HPA | 7 | VAC | 46 | AAM | 24 | NVPY | 8 | AA | 300 | 0.5 |
| 5 | 15 | EA | 7 | VAC | 58 | AAM | 12 | VMACAM | 8 | AA | 13000 | 0.5 |
| 6 |  |  | 21.3 | EA | 36 | AAM | 21.3 | NVPY | 21.4 | AA | 400 | 0.1 |
| 7 |  |  | 21.3 | EA | 36 | AAM | 21.3 | NVPY | 21.4 | AA | 400 | 0.2 |
| 8 |  |  | 21.3 | EA | 36 | AAM | 21.3 | NVPY | 21.4 | AA | 400 | 0.3 |
| 9 |  |  | 21.3 | EA | 36 | AAM | 21.3 | NVPY | 21.4 | AA | 400 | 0.4 |
| 10 |  |  | 21.3 | EA | 36 | AAM | 21.3 | NVPY | 21.4 | AA | 600 | 0.5 |
| 11 |  |  | 21.3 | EA | 36 | AAM | 21.3 | NVPY | 21.4 | AA | 400 | 0.6 |
| 12 |  |  | 21.3 | EA | 36 | AAM | 21.3 | NVPY | 21.4 | AA | 400 | 0.7 |
| 13 |  |  | 21.3 | EA | 36 | AAM | 21.3 | NVPY | 21.4 | AA | 400 | 0.8 |
| 14 |  |  | 21.3 | EA | 36 | AAM | 21.3 | NVPY | 21.4 | AA | 400 | 0.9 |
| 15 |  |  | 21.3 | EA | 36 | AAM | 21.3 | NVPY | 21.4 | AA | 400 | 1 |
| 16 | 30 | EA | 0 | VAC | 42 | AAM | 20 | NVPY | 8 | AA | 500 | 0.3 |
| 17 | 30 | EA | 0 | VAC | 42 | AAM | 20 | NVPY | 8 | AA | 500 | 0.7 |
| 18 | 30 | EA | 0 | VAC | 42 | AAM | 20 | NVPY | 8 | AA | 500 | 0.9 |
| 19 | 15 | EA | 7 | VAC | 46 | AAM | 24 | NVPY | 8 | MAA | 200 | 0.3 |
| 20 | 15 | EA | 7 | VAC | 46 | AAM | 24 | NVPY | 8 | MAA | 200 | 0.7 |
| 21 | 15 | EA | 7 | VAC | 46 | AAM | 24 | NVPY | 8 | MAA | 200 | 0.9 |
| 22 | 15 | HEMA | 7 | VAC | 46 | AAM | 24 | NVPY | 8 | AA | 400 | 0.7 |
| 23 | 15 | HEMA | 7 | VAC | 46 | AAM | 24 | NVPY | 8 | AA | 400 | 0.9 |
| 24 | 15 | EA | 7 | VAC | 38 | AAM | 20 | NVPY | 20 | AA | 600 | 0.3 |
| 24 | 15 | EA | 7 | VAC | 38 | AAN | 20 | NVPY | 20 | AA | 600 | 0.3 |
| 25 | 15 | EA | 7 | VAC | 38 | AAN | 20 | NVPY | 20 | AA | 500 | 0.7 |
| 26 | 15 | EA | 7 | VAC | 38 | AAN | 20 | NVPY | 20 | AA | 500 | 0.9 |
| 27 | 15 | EA | 7 | VAC | 40 | AAN | 30 | NVPY | 8 | AA | 100 | 0.5 |
| 28 | 15 | EA | 7 | VAC | 40 | AAN | 30 | NVPY | 8 | AA | 100 | 0.3 |
| 29 | 15 | EA | 7 | VAC | 40 | AAN | 30 | NVPY | 8 | AA | 100 | 0.7 |
| 30 | 15 | EA | 7 | VAC | 38 | AAN | 10 | NVPY | 30 | AA | 7000 | 0.3 |
| 31 | 15 | EA | 7 | VAC | 38 | AAN | 30 | NVPY | 30 | AA | 6000 | 0.7 |

The reaction is completed after 1 hour at 60° C.
The end product is characterized by the following data:

| pH value: | 6.75 |
|---|---|
| Concentration: | 29.59% by weight |
| Relative viscosity: | 100 mPa.s |
| Limit viscosity: | 0.27 |
| (determined in 0.1 N NaCl solution and at 25° C.) | |

In the application examples which follow, the polymers according to the invention are compared with known flow-control auxiliaries for mixtures of building materials. In this application, it is particularly important that the flow-control auxilairy leads to the most extensive distribution possible of the flow screed compound in the space concerned.

The so-called spread under standardized conditions is used to measure this flow-control effect in application tests. In addition, it is particularly important that the flow screed mixture retains its full effectiveness even after 1 hour. For this reason, the spread is determined again after 1 hour. In the ideal case, the spread after 1 hour should be exactly as large as the spread immediately after preparation of the flow screed mixture. In order to ensure rapid building progress, the flow screed must be capable of supporting foot traffic after 16 hours (i.e. on the morning of the next working day). For this reason, the foot traffic support capability is checked after 16 hours in the laboratory test for the flow screed application.

The flow screed test is carried out as follows:
The following recipe is used:

|          |                                           |
|----------|-------------------------------------------|
|          | 175 g of cement PZ 35                     |
|          | 175 g of fly ash                          |
|          | 725 g of sand, particle size of 0 to 2 mm |
| in total | 1,075 g of solids                         |

The amounts of flow-control auxiliaries (polymers) and antifoam agents added are referred to this quantity of solids of 1,075 g.

In all application examples, the following additives are used:
0.22% of flow-control auxiliary (100%), referred to the basic recipe amount,
0.1% of antifoam agent SB 2030 S, referred to the basic recipe amount.

The amount of water depends on the flowability of the screed. A total of 105 ml of water is used at the start, and more is added if required. In this initial total amount of water, the water is included which is brought by the polymer with its solution.

EXECUTION OF THE TEST

The sand, the cement and the fly ash are mixed dry in a laboratory mixer for 2 minutes. The polymer solution, the antifoam agent and the water are weighed into a beaker, stirred and then added to the homogeneous dry mixture of sand, cement and fly ash, the dry mixture being stirred during this.

After 2 minutes, the mixing process is stopped and the sample assessed according to whether the surface flows completely smoothly within 15 to 30 seconds. If this property has not yet been achieved, water is added in portions of 5 ml and this amount of water is subsequently stirred for 1 minute. The stirring process is then stopped again and it is again assessed whether the surface flows completely smoothly within 15 to 30 seconds. Just before this completely smooth flow is achieved, the water is only added in steps of 1 ml.

The amount of water which is required to achieve completely smooth flow should be as low as possible in order to avoid crack formation in the screed.

After completely smooth flow is achieved, the spread is determined. The screed must have been stirred for a total of 10 minutes to this point in time. The spread determination is then carried out.

DETERMINATION OF SPREAD

A plastic cylinder with a diameter of 7 cm and a height of 8.5 cm, which stands in the centre of a plastic bowl with a diameter of 32 cm, is filled completely with the flow screed. The plastic cylinder is then raised so that the flow screed can flow apart. After 3 minutes, the average diameter of the spread-out flow screed cake is determined by several measurements. This dimension indicates the spread. During flow of the screed, its surface, which should be as smooth as possible, is also assessed at the same time. The flow of the screed should also lead to a round shape if possible. After determination of the spread, the entire screed compound is poured into a polystyrene breaker and allowed to stand for 1 hour. After this time, which is measured from addition of the polymer solution to the dry mixture, the surface of the screed is checked for any skin formation. The screed is then stirred thoroughly, and an assessment is made as to whether the screed is already largely set. It should be possible to make the screed readily flowable again by stirring.

The spread is then determined again, as described above, and the surface assessed.

Finally, a sample of 100 g of screed is poured into a polystyrene beaker and this sample is allowed to harden for 16 hours.

FOOT TRAFFIC SUPPORT CAPABILITY TEST

The foot traffic support capability of the sample is checked by pressing hard on the surface with the finger. If the surface of the screed gives, then it is not capable of supporting foot traffic.

For the investigations, the polymers specified in Table 2 are used:

A commercially available melamine-formaldehyde condensation product, which is intended for use as a concrete plasticizer (comparison product), is used as Comparison Example C.

The results of the investigations with these products are collected in Table 2:

TABLE 2

| Flow-control agent according to Example No. | Water consumption | Spread immediately after preparation of the screed in ml | Spread 1 hour after addition of the flow control agent in ml | Remarks on flow after 1 hour | Foot traffic support capability |
|---|---|---|---|---|---|
| 1 | 128 | 235 | 240 | Easily fluidized by stirring, flows smoothly without sedimentation | capable |
| 2 | 127 | 245 | 240 | Easily fluidized by stirring, flows smoothly without sedimentation | capable |
| 4 | 125 | 225 | 235 | Easily fluidized by stirring, flows smoothly without sedimentation | capable |
| 7 | 129 | 270 | 240 | Easily fluidized by stirring, flows smoothly without sedimentation | capable |
| 8 | 125 | 250 | 220 | Easily fluidized by stirring, flows smoothly without sedimentation | capable |

TABLE 2-continued

| Flow-control agent according to Example No. | Water consumption | Spread immediately after preparation of the screed in ml | Spread 1 hour after addition of the flow control agent in ml | Remarks on flow after 1 hour | Foot traffic support capability |
|---|---|---|---|---|---|
| 13 | 125 | 260 | 240 | Easily fluidized by stirring, flows smoothly without sedimentation | capable |
| 19 | 135 | 225 | 230 | Easily fluidized by stirring, flows smoothly without sedimentation | capable |
| 21 | 130 | 220 | 250 | Easily fluidized by stirring, flows smoothly without sedimentation | capable |
| 23 | 129 | 220 | 250 | Easily fluidized by stirring, flows smoothly without sedimentation | capable |
| 25 | 125 | 255 | 230 | Easily fluidized by stirring, flows smoothly without sedimentation | capable |
| 31 | 127 | 245 | 240 | Easily fluidized by stirring, flows smoothly without sedimentation | capable |
| C | 118 | 230 | 160 | uneven surface, strong curvature of the screed cake | capable |

The results of the application investigations clearly show the superior effectiveness of the flow-control auxiliaries according to the invention compared to comparison product C.

The products according to the invention flow advantageously completely smoothly, without sedimentation.

The superiority of the products according to the invention becomes especially clear in the determination of the spread 1 hour after addition of the flow-control auxiliaries.

Here, all products according to the invention still have the essentially unchanged high starting spread and cause completely smooth flow of the screed without sedimentation.

Comparison product C, in contrast, leads to a screed cake with an uneven surface and strong curvature.

The products according to the invention thus achieve far higher effectiveness than the products known hitherto and thus represent a significant improvement in the state of the art.

We claim:

1. Water-soluble copolymers consisting of (1) 5 to 50 mol % of radicals of the formula I

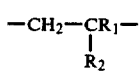

(2) 0 to 20 mol % of radicals of the formula II

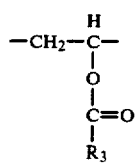

(3) 5 to 50 mol % of radicals of the formula III

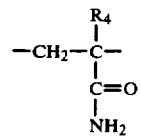

(4) 5 to 50 mol % of radicals of the formula IVa or IVb

 (IVa)

 (IVb)

(5) 2 to 50 mol % of radicals of the formula V

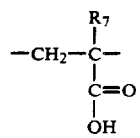

wherein, in the radicals I to V, $R_1$ denotes hydrogen or a methyl group, $R_2$ denotes an alkoxycarbonyl group with 1 to 4 C atoms in the alkoxy group, an alkanoyloxy group with 1 to 4 C atoms or a β-hydroxyalkoxycarbonyl with 2 or 3 atoms, $R_3$ denotes a methyl or an ethyl group, $R_4$ denotes hydrogen or a methyl group, $R_5$ and $R_6$, the same or different, denoting hydrogen, a methyl or ethyl group or a common trimethylene or pentamethylene ring, $R_7$ denoting hydrogen or a methyl group, and X denotes an imidazole or carbazole radical in the radicals I to V it being necessary for the sum of (1) to (5) always to give 100 mol %.

2. Water-soluble copolymer according to claim 1, characterized in that the polymers are reacted with low, aliphatic aldehydes and a sulphite, 0.1 to 1 mol per mol of the radicals of the formula III of aldehyde being added.

3. Water-soluble copolymers according to claim 1, characterized in that they comprise
(1) 10 to 40 mol % of radicals of the formula I
(2) 0 to 15 mol % of radicals of the formula II
(3) 20 to 50 mol % of radicals of the formula III
(4) 10 to 40 mol % of radicals of the formula IVa or IVb
(5) 5 to 30 mol % of radicals of the formula V
which have been reacted with formaldehyde and Na hydrogen sulphite.

* * * * *

UNITED STATES PATENT AND TRADEMARK OFFICE
CERTIFICATE OF CORRECTION

PATENT NO. : 4,703,087
DATED : Oct. 27, 1987
INVENTOR(S) : Lange et al.

It is certified that error appears in the above-identified patent and that said Letters Patent is hereby corrected as shown below:

Col. 1, line 67     Correct spelling of --amounts--
Col. 2, line 3     Delete "s" from "hours"
Col. 3, line 54     Correct spelling of --sodium--
Col. 8, line 24     Correct spelling of --beaker--
Col. 10, line 58     Insert --C-- after "3"

Signed and Sealed this

Fourteenth Day of June, 1988

Attest:

DONALD J. QUIGG

*Attesting Officer*     *Commissioner of Patents and Trademarks*